Oct. 20, 1953                    A. LAUR                   2,656,469
          METHOD OF AND APPARATUS FOR FLUOROSCOPING AND
          RADIOGRAPHING RENAL ORGANS OF THE HUMAN BODY
Filed Sept. 8, 1951                                2 Sheets-Sheet 1
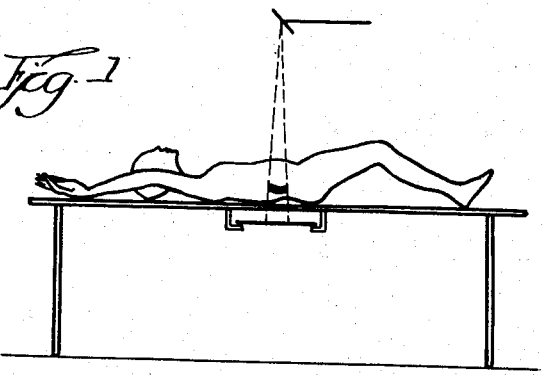
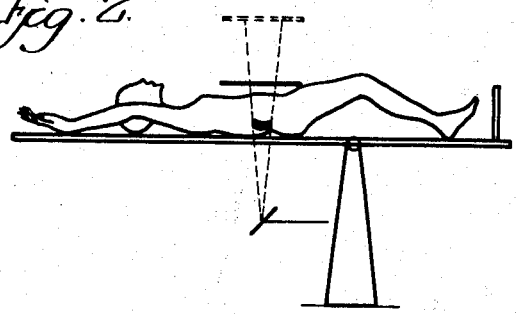
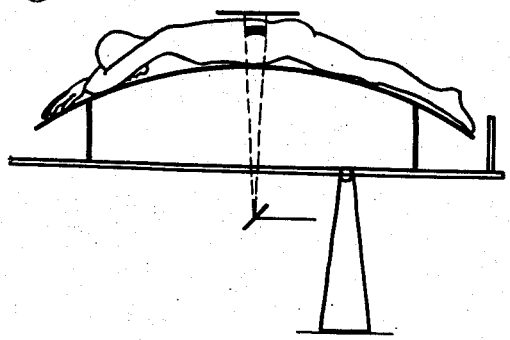
Inventor.
Albert Laur.
By

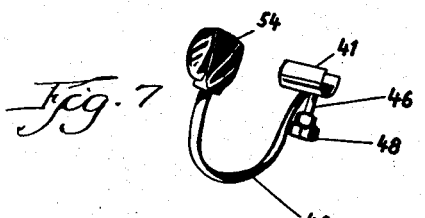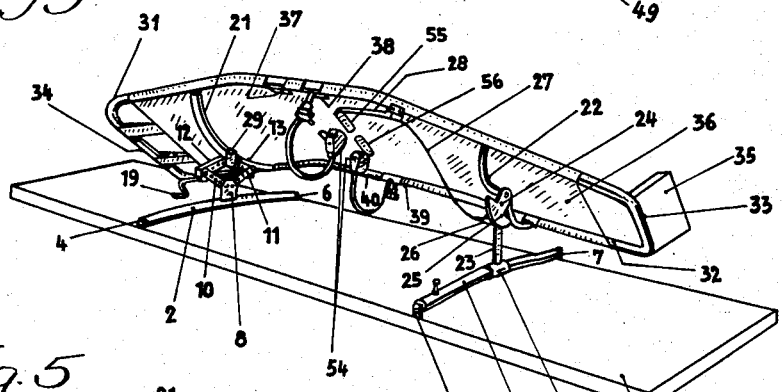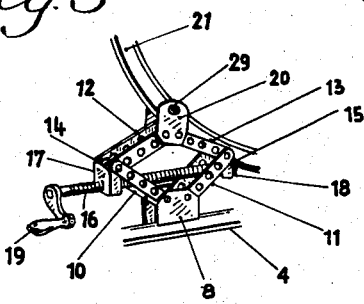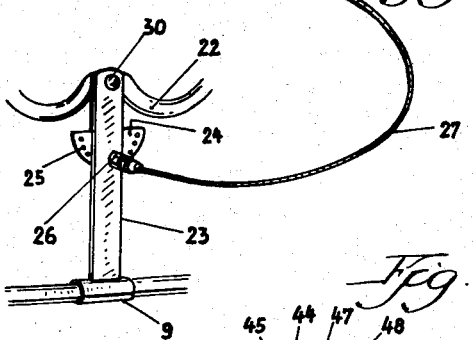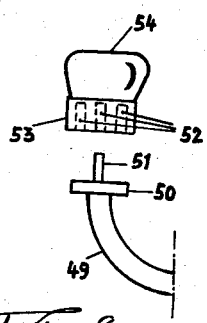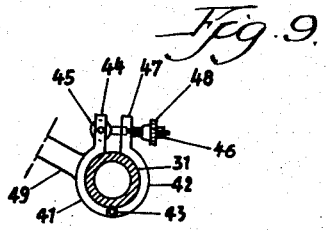

UNITED STATES PATENT OFFICE 2,656,469

METHOD OF AND APPARATUS FOR FLUOROSCOPING AND RADIOGRAPHING RENAL ORGANS OF THE HUMAN BODY

Albert Laur, Heidelberg-Baden, Germany

Application September 8, 1951, Serial No. 245,681
In Germany September 11, 1950

20 Claims. (Cl. 250—57)

This invention is concerned with a method of and apparatus for fluoroscoping and radiographing dorsal body parts, and especially renal organs of the human body without subjecting the body to positional changes.

Fluoroscopic examinations and radiographic exposures of renal organs, e. g., the kidneys, have heretofore been made by the aid of different apparatus, requiring changing of bodily positions. The necessity for this procedure results from the particular conditions that must be considered in the case of fluoroscoping and radiographing, respectively. The X-rays are point-shaped in the focus of the tungsten mirror of the anode, and pictures sharp in contour and approximately true to size can therefore be produced only with a large focus object and relatively small film spacing. Only in this manner is it possible to obtain with a given central projection the greatest possible approximation to the parallel ray path.

The recognition of this fact is already being used in radiographing the heart, by employing a spacing of about two meters between the focus of the X-ray tube and the heart to be fluoroscoped or radiographed.

However, such procedure is not possible in the X-ray diagnosis of the renal passages, due to the dorsal position of the organs. Film exposures in such cases are made upon a horizontal shutter table, with the patient lying on his back and with a focal spacing of about one meter. Only in such position is it possible to obtain positioning of the renal region relatively close to the film. The X-ray tube is in this procedure above the body (see also Fig. 1) and is spaced by about one meter from the film which is positioned directly underneath the table. While the requirements for a good photographic exposure are present under these conditions, there is no possibility of fluoroscoping the renal organs, which is necessary as a valuable complement to the radiographing, so as to determine details which are to be produced on the plate and, above all, to carry out the photographic exposure, in intravenous pyelography, at the proper instant.

It is therefore in the case of intravenous pyelography (also referred to as elimination urography) only possible to make over-all pyelograms spaced after intravenous injection of the contrast substance by seven, fifteen and thirty minutes or more, depending on the findings. Since fluoroscopic observation cannot be made, there is no possibility of carrying out an aimful renal duct compression so as to obtain better filling of the structures with the contrast solution and an accordingly better anatomical representation of the kidney cavity system. The compression is practically effective only at the transition of the spinal column into the pelvis. The placing of compressors, which is made without fluoroscoping, at the wrong point can thus be discovered only after the lapse of the above mentioned intervals, because seven minutes must be allowed for the required progress in the elimination. About five minutes are required for the developing and for fixing the exposure, thus entailing the loss of valuable time intervals for elimination of the contrast solution. In the case of well-adhering compression in the presence of vigorous kidney excretion, there is also danger of overfilling the kidney basin with backflow of urine containing the contrast solution into the kidney tissue. Many urologists have for this reason rejected the renal duct compression in spite of the good filling picture of the elimination duct system that may be obtained.

The illumination of the renal organs (pyeloradioscopy) remained desirable nevertheless. Heretofore it could again be carried out only with the table of the illumination apparatus tipped to horizontal position and with the patient on his back, the X-ray tube in this case being positioned underneath the table and the film or plate holder above the patient. (See also Fig. 2.) The focus of the X-ray tube is in such arrangement generally fixedly spaced from the plane of the table, and the result therefore is an undesired diminution of the spacing of the focus object. The spacing of the film from the object is at the same time, due to the dorsal position of the kidney, doubled by almost the full thickness or depth of the patient's body. Fluoroscopic examinations and over-all X-ray exposures made in this procedure, by increasing the upward spacing of the film or plate from the body, resulted in centrally magnified perspective object pictures which distorted reality and did not show sharp contours, being therefore of doubtful and limited diagnostic value.

The procedure described under the conditions noted in the foregoing paragraph remain useful only for directional exposures incident to the use of the compression tubes as they are employed in diagnostic work involving the stomach. In order to obtain an over-all view, however, it was in such cases also required to change the position of the patient's body while lying upon the flat shutter table, thereby entailing the danger of flow of the contrast solution into the bladder. The procedure is not only cumbersome but is with fixedly placed compressors almost impossible.

The problems resulting from this situation are, in accordance with the invention, solved by giving the longitudinal axis corresponding to the body, prior to the examination and exposure which are carried out in the identical body position, an arcuate form which is concave to the focus of the X-ray tube and which approximately cancels the normal curvature of the dorsal region of the spine, whereupon the fluoroscopic screen and/or the photographic plate are brought into a position substantially parallel to the plane of the corresponding renal region.

The objects indicated above and additional objects and features will be brought out in the course of the detailed description of the invention which will presently be rendered with reference to the accompanying drawings. In these drawings, Figs. 1 and 2 indicate in diagrammatic manner prior examination procedures referred to before;

Fig. 3 illustrates in a similar diagrammatic manner the procedure according to the invention;

Fig. 4 shows in simplified perspective view a device for practicing the invention arranged on the angularly adjustable table of a normal X-ray apparatus, the new device being indicated in angularly tilted position in order to show more clearly associated carrier, support and adjustment means therefor;

Fig. 5 illustrates the raising and lowering means for the device relative to the table underneath;

Fig. 6 indicates adjustment and locking means;

Fig. 7 illustrates a compressor and its mounting;

Fig. 8 illustrates a compressor removed from its mounting; and

Fig. 9 shows a clamp device for fastening the mounting for the compressor on the apparatus.

The prior radiographing procedure mentioned before, in which the patient lies on his back on the horizontally adjusted table is apparent from Fig. 1. The X-ray tube is disposed above the patient's body, spaced about one meter from the plate which is underneath the table. As already explained, the arrangement satisfies the requirements for radiographic exposure, but does not give the possibility of fluoroscoping the renal organs.

The prior procedure in pyeloradioscopy is illustrated in Fig. 2. As explained before, the illumination is carried out with the patient lying on his back on the horizontally adjusted table. The X-ray tube focus is in the arrangement generally fixedly spaced from the plane of the table, resulting in an undesired diminution of the spacing from the focus object. The spacing of the film or plate from the object is nearly doubled, due to the dorsal position of the renal structures. Fluoroscopic examinations and also X-ray exposure carried out with the film in the dotted-line position result in object images which are centrally perspective, magnified out of reality and exhibiting indistinct contours, therefore being of limited diagnostic value.

The method according to the invention will be apparent from an examination of Fig. 3. It will be seen that the new method avoids all the previously indicated difficulties and drawbacks. The patient's body is, prior to the examination, brought into an arcuate position which substantially cancels (corrects or adjusts) the normal spiral curvature, placing the corresponding renal body region in a position extending in a substantially flat plane. The concave side of the arcuate longitudinal line faces the focus of the X-ray tube. The fluoroscope screen or the photographic plate is disposed in a position in a plane which extends substantially in parallel with the flat plane of the adjusted dorsal region. The illumination with screen observation and also the film exposure, which are required in intravenous pyelography (ural diagnostic procedure) can be carried out with the body in the identical position. The technical conditions for the X-ray beam are exceedingly favorable because it is possible to realize for the parallel ray path a sufficiently great spacing of the focus of the X-ray tube from the object with the smallest possible spacing of the film or plate from the object. The arcuate bending of the body produces a stretched position of the renal region which appears, as indicated in Fig. 3, over a long area almost horizontal so that the screen and the film can be brought closer to the kidneys than in any other body position.

The placing of the body face down reduces the thickness or depth line thereof by laterally deflecting the soft abdominal and adipose tissue, as well as the internal organs, which effect becomes increasingly pronounced with increasing body depth. This feature is of considerable importance because reduction of the depth line of the body by one-sixth, due to mass absorption, reduces the weakening of the rays by one-half of the ray energy. This means that the body is irradiated by twice the amount of rays. The further consequence is that the ray intensity may be reduced, which is of course generally desirable. Furthermore, the technical aspects of the exposures improve with diminishing depth of the body which is to be penetrated by the rays, due to the reduction of stray radiation.

Extraordinarily favorable conditions result for the compression of the renal ducts, which takes place by the weight of the body, on the compressor or compressors disposed underneath, and which therefore is not as annoyingly felt as the application of compressors which are forcibly pressed into the abdomen.

Moreover, an overfilling of the kidney basin with backflow of the urine into the tissues is avoided, due to the short intervals required for all steps, and especially when using illumination as an aid, and the reasons cautioning against the use of renal duct compression are thereby removed.

Fuoroscopic examinations and X-ray exposures may also be made with the patient in upright position. Patients unable to stand may be examined, fluoroscoped and radiographed exclusively in the horizontal arcuate face-down position shown in Fig. 3.

Additional advantages may be obtained by placing the patient against the apparatus while in upright position and imparting to his body the arcuate curvature by supportive leaning of the chest and abdomen thereagainst and thereafter tilting the apparatus to place the patient face down while giving constant support to his weight. The advantage of such procedure is that the patient is placed effortlessly, automatically and without any muscular exertion exactly into the position which is required for the purpose of obtaining the previously mentioned advantages.

The invention may be realized by corresponding construction of the tilting table of an X-ray machine, the features of the invention forming a unit with such table. Such a structure may serve certain cases, e. g., in large hospitals, for special use in fluoroscoping and radiographing renal organs. The apparatus may, however, be provided for general practice by the provision of an auxiliary device which is adapted to exercise the invention in connection with the normal adjustable table of an X-ray machine so as to carry out fluoroscoping and radiographing of renal organs, when required, and for thereafter removing the apparatus so as to restore the X-ray machine for other general X-ray work.

The invention will now be described with reference to Figs. 4-9.

Numeral 1 indicates the adjustable tilting table of a normal X-ray machine. The X-ray tube and its mounting, as well as auxiliary equipment for fluoroscoping, have been omitted from Fig. 4 because they are well known and generally indicated in Fig. 3.

The auxiliary device which is to be fastened to the tilting table 1 comprises the transverse mounting bars 2 and 3. At one end of each of these bars is provided a resilient grip, as indicated at 4 and 5, for engagement with one edge of the tilting table 1. The other ends of the bars 2 and 3 carry fixed grip members 6 and 7 for engagement with the table at the opposite edge thereof. The grips 4 and 5 may be snapped into brackets which are usually provided along the edge of the table for the purpose of fastening thereto auxiliary devices, belts or the like. Numerals 8 and 9 indicate points from which extend vertical uprights. Pivotally linked with the upright 8 are the arms 10, 11 of a double-toggle joint having the complementary arms 12, 13. The joint members 14, 15 may be adjusted relative to one another by means of the spindle 16 and the coacting nuts 17, 18. The spindle is operated by the crank or handle 19. The member 20 of the toggle joint may thus be raised and lowered in a direction perpendicular to the plane of the table 1. The member 20 forms a double-plate journal for adjustably accommodating between its plates, at 29, the crossarm 21. Another crossarm 22 is at 30 similarly adjustably journaled on the upright 23 projecting at 9 from the mounting bar 3.

Firmly connected with the crossarm 22 is a segment-shaped member 24 carrying peripherally disposed, angularly spaced holes 25. The tubular member 26 on the upright 23 contains a locking pin which may be inserted in any of these holes, for locking the apparatus in any angular adjusted position. From the tubular member 26 extends the cable of a Bowden pull 27, the wire of which terminates in the handle 28. The locking pin may be removed from engagement with any of the holes 25 in which it may have been inserted, by actuating the handle 28 so that the whole frame of the apparatus is freed for desired angular adjustment about the pivot points 29, 30. The frame may then again be locked in the desired angularly adjusted position by insertion of the pin in the tubular member 26 into the corresponding hole 25. The handle 28 is suitably secured to the longitudinal member 31 of the frame, which may be made of tubular material, and which comprises the oppositely disposed longitudinal frame member 32 and the transverse portions 33, 34. A footrest 35 may be provided on the transverse frame portion 33 on which the patient may step to facilitate the positioning. Canvas cloth or the like indicated at 36 may be used to provide a surface for supporting the patient. The longitudinal frame members 31—32, as shown in Fig. 4, form intermediate their opposite ends straight portions extending along a section which corresponds to the dorsal renal region of the patient, when the patient is positioned on the support 36. These intermediate portions may be positioned, by corresponding adjustment of the frame, to extend in a plane which parallels the plane of the table 1.

The longitudinally extending frame members 31, 32 may be employed as carriers for the mountings of renal duct compressors. The canvas covering 36 is for this purpose provided with cutouts 37—38 and 39—40, respectively, in which the compressor mountings are to be disposed, the cutouts corresponding to varying body levels of patients, that is to say, varying levels according to the heights of men, women and children. At these places of the frame members 31, 32 may be disposed clamps comprising the segments 41, 42 (see Fig. 9) which are pivotally joined at 43. These segmental clamp parts may be adjusted and fixed relative to one another by the screw device indicated at 45, 46 and 48 which coacts with the flanges 44 and 47, the flange 47 being slotted so as to guide the screw spindle. The nut 48 is made in the form of a knurled knob. The compressor is mounted on an arm 49 extending from the clamp segment 41. Accordingly, when the compressor is to be used, the clamp is put on the corresponding frame member 30—32, and the nut 48 is tightened to fix it in place. The removal is effected similarly, simply by loosening the nut 48, angularly rotating the screw spindle out of the slot in the flange 47, whereupon the clamp and with it the mounting 49 and the associated compressor are removed as a unit.

The arm 49 terminates in a plate 50 carrying a pin 51. This pin may be inserted in any one of a number of holes 52 in the compressor base plate 53. The compressor head is indicated by the numeral 54.

The canvas support 36 is provided with cutouts 55, 56 for accommodating the compressor heads 54. These cutouts may be covered by a rubberized cloth or by a rubber sheet extending over part or a whole of the canvas support so as to prevent protrusion therethrough of parts of the patient's abdomen, which would alter the body depth at such places. Without the provision of the coverings for the cutouts 55—56, there would therefore occur density differences incident to fluoroscoping as well as radiographing.

The fastening and adjusting means described above make it possible to dispose compressors in easy manner underneath the patient's abdomen exactly where they are needed for the desired compression of the renal ducts.

The apparatus may be made light weight by using tubular structural parts of light metal, so as to avoid burdening of the tilting table of the X-ray machine and to make the handling by a nurse possible without undue exertion.

The operation of the apparatus is believed to be generally apparent from the foregoing explanations, but may for convenience be summarized as follows:

The patient (assuming an ambulatory case) approaches the apparatus, which is in upright position, and steps on the foot plate 35 extending from the transverse frame member 33. In order to facilitate entry into a relatively small space, which may be available between the apparatus and the devices for radiographing and fluoroscoping, respectively, the frame may be adjusted to its extreme angular position so that one of the longitudinal frame members is close to the tilting table 1. The patient enters from this lateral side. In the angular position in which the apparatus is shown in Fig. 4, the patient would therefore enter from the right of the table 1. The handle 28 of the Bowden pull is then operated, and the frame 31—32—33—34 is rotated into an angular position in which the transverse frame parts 33—34 are disposed in planes extending in parallel with the plane of the table 1. The toggle device 8, 10, 20 has been adjusted before so that the transverse frame member 34 is spaced from the plane of the tilting table, in accordance with the depth of the patient's body. The tilting table 1 is now moved from upright to horizontal position. The body depth of the patient is in this position reduced, due to the lateral shifting of the soft abdominal parts, and the frame is now raised by the actuation of the crank 19, so as to bring the renal region of the patient as close as possible to the fluoroscope screen or to the plate holder, respectively, and in parallelism with the plane of the table 1, resulting in the position indicated in Fig. 3. Compressors 54, if such are to be used, are put in place while the apparatus is in upright position. The desired compression is effected when the patient assumes the face-down position, by the pressure exerted by the corresponding abdominal parts of the patient on the compressors disposed underneath.

Whether or not the compressors are in proper place is ascertained by fluoroscopic examination and adjustments are made if required. The proper moments for the photographic exposures are likewise ascertained by fluoroscopic examination. The radiographing is then effected by quickly changing the screen and plate holders, or, rather, by sliding the latter in place without necessitating any positional change in the patient. Screen observations and exposures can then alternately follow, as desired and as required, to obtain well aimed and diagnostically well usable pictures having extraordinarily sharp contours.

The oblique angular positioning of the frame relative to the plane of the tilting table serves of course not only to facilitate the handling of the apparatus, but also for making exposures and examinations in angular directions, so far as desired or required. The toggle joint device 8, 10, 20 may similarly be employed for the purpose of bringing about positional changes of the organs that have to be illuminated for any technical reasons, including utilization of the radiation, or for reasons connected with fluoroscoping or radiographing.

I claim:

1. Apparatus for alternately fluoroscoping and radiographing renal organs of the human body while the body remains in identical position having a longitudinally arcuately shaped frame comprising longitudinal frame members extending substantially in parallel, identical intermediate sections of said frame members extending along straight lines, an X-ray-permeable support disposed between and carried by said frame members for receiving a patient, said patient facing said support, and the renal region of such patient's body coinciding with the portion of said support which extends between said straight intermediate frame sections, an X-ray tube disposed underneath said X-ray-permeable support, a holder for fluoroscoping and radiographing means disposed above said patient's dorsal renal region and adjusting means for positioning said frame with the portion of said support extending between said straight intermediate sections facing the focus of the X-ray tube.

2. The apparatus defined in claim 1, comprising an adjustable table, and means for mounting said adjusting means on said table.

3. The apparatus defined in claim 1, comprising an adjustable table, means for mounting said adjusting means on said table, said adjusting means being effective to position said frame with said straight intermediate sections thereof disposed in parallel with the plane of said table.

4. The apparatus defined in claim 1, comprising means for adjusting said frame angularly about the longitudinal axis thereof.

5. The apparatus defined in claim 1, comprising an adjustable table, means for mounting said adjusting means on said table, and means for angularly adjusting said frame in a direction extending perpendicular to the plane of said table.

6. The structure defined in claim 1, together with renal duct compressor means, and means for mounting said compressor means on the longitudinally extending arms of said frame within the sections thereof which extend along straight lines.

7. The structure defined in claim 1, together with renal duct compressor means, means for mounting said compressor means on the longitudinally extending arms of said frame within the sections thereof which extend along straight lines, cutouts formed in said X-ray-permeable support for said compressor means, and rubber coverings for said cutouts.

8. The renal duct structure defined in claim 1, together with compressor means, and means for adjustably mounting said compressor means on the longitudinally extending arms of said frame.

9. Apparatus for fluoroscoping and for radiographing renal organs of the human body comprising a longitudinally arcuately shaped frame carrying an X-ray-permeable support for receiving a patient, the arcuate shape of said frame and support being effective to correct the normal curvature of the spine to dispose the renal region of the patient in a substantially flat plane, and adjusting means for positioning said frame and support with the concave side thereof facing the focus of the X-ray tube, said adjusting means comprising a device for removably securing said frame on the adjustable table of an X-ray machine, said device comprising transverse mounting bars, a resilient fastener at one end of each bar for engagement with one longitudinal edge of said table, and a relatively fixed fastener at the opposite end of each bar for engagement with the other longitudinal edge of said table.

10. Apparatus for fluoroscoping and for radiographing renal organs of the human body comprising a longitudinally arcuately shaped frame carrying an X-ray-permeable support for receiving a patient, the arcuate shape of said frame and support being effective to correct the normal curvature of the spine to dispose the renal region of the patient in a substantially flat plane, and adjusting means for positioning said frame and support with the concave side thereof facing the focus of the X-ray tube, said adjusting means comprising a device for removably securing said frame on the adjustable table of an X-ray machine, said device comprising transverse mounting bars for mounting engagement with said table, supporting means extending from said bars, and arms extending from said supporting means for holding the longitudinally disposed portions of said frame.

11. Apparatus for fluoroscoping and for radiographing renal organs of the human body comprising a longitudinally arcuately shaped frame carrying an X-ray-permeable support for receiving a patient, the arcuate shape of said frame and support being effective to correct the normal curvature of the spine to dispose the renal region of the patient in a substantially flat plane, and adjusting means for positioning said frame and support with the concave side thereof facing the focus of the X-ray tube, said adjusting means comprising a device for removably securing said frame on the adjustable table of an X-ray machine, said device comprising transverse mounting bars for engagement with said table, vertically adjustable supporting means extending from at least one of said bars, and arms extending from said supporting means for holding said frame in engagement with the longitudinally disposed portions thereof.

12. Apparatus for fluoroscoping and for radiographing renal organs of the human body comprising a longitudinally arcuately shaped frame carrying an X-ray-permeable support for receiving a patient, the arcuate shape of said frame and support being effective to correct the normal curvature of the spine to dispose the renal region of the patient in a substantially flat plane, and adjusting means for positioning said frame and support with the concave side thereof facing the focus of the X-ray tube, said adjusting means comprising transverse mounting bars for engagement with the table of an X-ray machine, supporting means for said frame, and link means between said transverse mounting bars and said supporting means.

13. Apparatus for fluoroscoping and for radiographing renal organs of the human body comprising a longitudinally arcuately shaped frame carrying an X-ray-permeable support for receiving a patient, the arcuate shape of said frame and support being effective to correct the normal curvature of the spine to dispose the renal region of the patient in a substantially flat plane, and adjusting means for positioning said frame and support with the concave side thereof facing the focus of the X-ray tube, said adjusting means comprising transverse mounting bars for engagement with the table of an X-ray machine, supporting means for said frame linked to said transverse mounting bars, means for angularly adjusting said frame relative to said table, and means for securing the angular adjustment of said frame.

14. Method of alternately fluoroscoping and radiographing renal organs of the human body while maintaining the body in identical position comprising the following steps, namely, positioning the patient in face-down position on a suitable support which is effective to hold the dorsal portion of the patient's renal region in a substantially flat plane disposed above the focus of an X-ray tube, and positioning the fluoroscope screen and the photographic plate, respectively, in operating position dorsally of and in close proximity to said dorsal portion of the patient's renal region in a plane relative thereto which substantially parallels the flat plane thereof.

15. Apparatus for alternately fluoroscoping and radiographing renal organs of the human body while maintaining the body in identical position comprising a support for receiving a patient in face-down position, said support being effective to hold the dorsal portion of the renal region of said patient's body in a substantially flat plane, an X-ray tube disposed with its focus underneath said renal region, and a holder for disposing the fluoroscope screen and the photographic plate, respectively, in operating position dorsally of and in close proximity to said dorsal portion of the patient's renal region in a plane relative thereto which substantially parallels the flat plane thereof.

16. The apparatus defined in claim 15, comprising means for angularly adjusting said support in planes of rotation about an axis which extends longitudinally thereof.

17. The apparatus defined in claim 15, comprising means for angularly adjusting said support in planes of rotation about an axis which extends transversely thereof.

18. The apparatus defined in claim 15, comprising means for angularly adjusting said support in planes of rotation about axes which extend respectively longitudinally and transversely thereof.

19. The apparatus defined in claim 15, comprising a renal compressor, and means for adjustably disposing said compressor so as to position it for renal compression underneath the abdomen of a patient when such patient is in face-down position on said support.

20. The apparatus defined in claim 15, wherein said support comprises a frame having longitudinally extending members disposed substantially in parallel and an X-ray-permeable sheath between said members for receiving the patient, a rental duct compressor, a mounting for said compressor, and means for adjustably disposing said mounting so as to position said compressor for renal duct compression underneath the abdomen of the patient when the patient is in face-down position on said sheath, a cutout for said compressor being formed in said sheath, and a covering for said cutout.

ALBERT LAUR.

References Cited in the file of this patent

UNITED STATES PATENTS

| Number | Name | Date |
|---|---|---|
| 1,599,434 | Rose | Sept. 14, 1926 |
| 1,600,598 | Meyer | Sept. 21, 1926 |
| 1,814,482 | Miller | July 14, 1931 |
| 1,925,425 | Wilent | Sept. 5, 1933 |
| 2,152,734 | Ford | Apr. 4, 1939 |
| 2,456,277 | Heitz-Boyer | Dec. 14, 1948 |
| 2,475,003 | Black | July 5, 1949 |

FOREIGN PATENTS

| Number | Country | Date |
|---|---|---|
| 451,607 | Germany | Oct. 29, 1927 |